United States Patent [19]

Meller et al.

[11] Patent Number: 4,577,840
[45] Date of Patent: Mar. 25, 1986

[54] SELF-PUMPING HYDROPNEUMATIC SPRING LEG OR STRUT WITH INTERNAL LEVEL CONTROL FOR MOTOR VEHICLES

[75] Inventors: Theo Meller; Heinz Knecht, both of Eitorf; Werner Kuchheuser, Windeck, all of Fed. Rep. of Germany

[73] Assignee: Boge GmbH, Eitorf, Fed. Rep. of Germany

[21] Appl. No.: 583,187

[22] Filed: Feb. 24, 1984

[30] Foreign Application Priority Data

Feb. 24, 1983 [DE] Fed. Rep. of Germany ....... 3306393

[51] Int. Cl.⁴ .......................... B60G 17/04; F16F 9/18
[52] U.S. Cl. ................................ 267/64.17; 137/843; 137/859
[58] Field of Search ............. 267/8 R, 64.17, DIG. 2; 137/843, 859; 188/315; 280/708

[56] References Cited

U.S. PATENT DOCUMENTS

| 3,497,199 | 2/1970 | Tuczek | 267/64.17 |
| 4,502,672 | 3/1985 | Meller et al. | 267/64.17 |

FOREIGN PATENT DOCUMENTS

| 1287454 | 1/1969 | Fed. Rep. of Germany . |
| 1555126 | 8/1969 | Fed. Rep. of Germany . |
| 2356802 | 10/1975 | Fed. Rep. of Germany . |
| 2944831 | 5/1980 | Fed. Rep. of Germany . |
| 56-13208 | 2/1981 | Japan | 267/64.17 |

Primary Examiner—Bruce H. Stoner, Jr.
Assistant Examiner—Richard R. Diefendorf
Attorney, Agent, or Firm—Nils H. Ljungman

[57] ABSTRACT

A simple, operationally reliable and not-overly-sensitive level control in a generally known form of self-pumping hydropneumatic spring leg or strut is of such a construction that a delayed adjust-down control action can be achieved when a control opening is opened upon reaching a certain level. For that purpose, a sleeve is fitted as or as part of a throttle arrangement between the control opening of a hollow pump rod and a suction valve arranged at the end of the pump rod, the sleeve allowing oil to flow with a delay from the high pressure chamber which controls the level, by way of the control opening of the pump rod to the pump rod bore, the bore communicating with a low pressure chamber from which oil is normally pumped to the high pressure chamber. By removing the throttling responsibility from the control opening, size restrictions on the control opening are removed, thus facilitating sizing the control opening so as to preclude clogging. The throttling and delay functions can be accomplished by appropriately sizing the length and cross section of a duct defined in part by the sleeve, or by a throttle opening defined in part by the suction valve. In the latter arrangement, a self clearing action is achieved when the suction valve lifts from its seat.

14 Claims, 7 Drawing Figures

SELF-PUMPING HYDROPNEUMATIC SPRING LEG OR STRUT WITH INTERNAL LEVEL CONTROL FOR MOTOR VEHICLES

FIELD OF THE INVENTION

This invention relates to a self-pumping hydropneumatic spring leg or strut with internal level control, in particular for motor vehicles. Known versions of such devices comprise an oil-filled working cylinder which is subjected to the pressure of gas cushions, and a force transmitting piston which is displaceable in the working cylinder, the piston being carried at the end of a hollow piston rod. The hollow space in the piston rod serves as a pump cylinder for a pump rod which is secured to the cylinder to pump liquid from a low pressure chamber to a high pressure chamber. The pump rod is provided with a bore and a suction valve, such that oil is pumped from the low pressure chamber, through the bore and past the suction valve, to a high pressure chamber. The working piston subdivides the working cylinder into two working chambers, and in a predetermined working position, a control opening is opened to connect the working chamber that communicates with the high pressure chamber to the low pressure chamber, such that an adjust-down function is obtained.

BACKGROUND AND SUMMARY

Level control assemblies of the generally described kind are known in which, in a predetermined position of the working piston, after the control opening has been opened by displacement of the piston rod, the oil can flow from the high pressure chamber by way of the control opening directly to the low pressure chamber. A disadvantageous effect in that arrangement is that when the control opening is opened for a short period of time, the pressure is reduced in a short time. A reduction in pressure in a short time in that way occurs, for example, after the vehicle has taken a curve at high speed, or after heavy braking in which the rear of the vehicle rises. The undesired change in the positional level under these circumstances gives rise to disadvantageous effects on the performance and road holding of the vehicle. For examples of such known devices, see German Pat. No. 1,630,107, U.S. Pat. No. 3,497,199, U.S. Pat. No. 4,368,878, and commonly assigned U.S. Pat. No. 4,502,672.

Level control arrangements are also known (for example, German laid-open application (DE/OS) No. 3020050) which use a plurality of control openings operating in conjunction with a conical or tapered piston rod. In an effort to provide a suitably delayed pressure reduction time, it is not possible to reduce the diameters of the control openings to just any value that may be desired, since, with openings of less than a given diameter, there is the danger that impurities in the oil may jam in the control opening and thus adversely affect the adjust-down performance.

With the foregoing as the basic starting point, an object of the present invention is to provide a simple, operationally reliable and relatively insensitive level control arrangement, in which the adjust-down time is increased so as to avoid undesired alterations in positional level, even when, for instance, the vehicle is taking a curve and/or experiencing heavy braking.

According to the invention, that object is attained in that disposed in the pump rod is a sleeve which connects the control opening to the bore in the pump rod by way of a connecting duct and a throttle means, the sleeve optionally functioning as or as part of the throttling arrangement. An advantage with this arrangement is that the sleeve provides a duct for the oil flowing from the control opening to the pump rod bore. The sleeve, which itself serves to effect a delay action, prevents the oil from flowing directly from the high pressure chamber into the lower pressure chamber so that the control opening no longer need operate as a throttle, but rather throttle means of various configurations may be utilized as a time delay means. For that reason, it is possible for the diameter of the control opening to be increased, while the danger of a blockage due to impurities in the oil is reduced. With this control feature, on the one hand, the control opening is rendered less fine for harsh vehicle operating conditions, and at the same time a relatively insensitive control component or feature is provided, while, on the other hand, the arrangement provides an adjust-down time which has a time delay.

In accordance with a particularly preferred embodiment, the throttle means cooperates with the suction valve located at one end of the pump rod bore.

In accordance with an advantageous feature, the throttle means is disposed in the end surface of the sleeve and has at least one opening, and the remaining end surface of the sleeve serves as an abutment surface for the valve plate of the suction valve. That arrangement eliminates the disadvantages of a blockage of the opening as, during subsequent actuation of the suction valve, the valve plate lifts away from the end surface of the sleeve and the pump rod so that the oil flowing therepast can flush away the pieces causing a blockage. That arrangement therefore provides a self-cleaning effect, and ensures that any blockage can only last for a short period of time. It is advantageously also possible for a wedge-shaped depression to be provided as the opening, and such a depression can be easily produced by a non-cutting production operation.

In accordance with a preferred embodiment of the invention, the suction valve has a valve plate which is supported on the end surface of the pump rod and which bends, under a prestress, and which, together with the end surface of the sleeve that is disposed at a spacing, forms the throttle means. That embodiment provides a load-dependent or pressure-dependent delay, by virtue of the use of a sleeve having an end surface of a given value under the operative surface area of the suction valve. A variable pressure-dependent throttle cross section is formed by virtue of different degrees of bending of the resilient spring plate at different pressures, thus varying the throttle passage between the sleeve and the resilient spring plate.

Additionally, delays in the adjust-down control action may be achieved by the connecting duct being in the form of a throttle means and having a predetermined throttle cross section over at least a part of its length. The throttle cross section may be formed by using a suitable annular gap between the inside diameter of the pump rod and the outside diameter of the sleeve.

Another advantageous possible feature provides that, to act as the throttle means, the connecting duct may be arranged to extend in a helical configuration on the outside surface of the sleeve or the inside surface of the pump rod. It is advantageous in that arrangement for the length and the cross section to correspond to the value to be throttled. By virtue of this configuration of the connecting duct, the oil flow is delayed so that the desired throttling value is achieved by virtue of a suitable selection in respect of the cross section and the length of the groove.

In all embodiments of the invention, the advantages of the invention are achieved in fundamentally the same manner, in that an undesired alteration in positional level can be achieved by a throttled control action producing a drop in pressure.

Other features and advantages of the invention will become apparent to those skilled in the art from the ensuing description of preferred embodiments taken in conjunction with the appended drawings.

DESCRIPTION OF PREFERRED EMBODIMENTS

Figure 1:
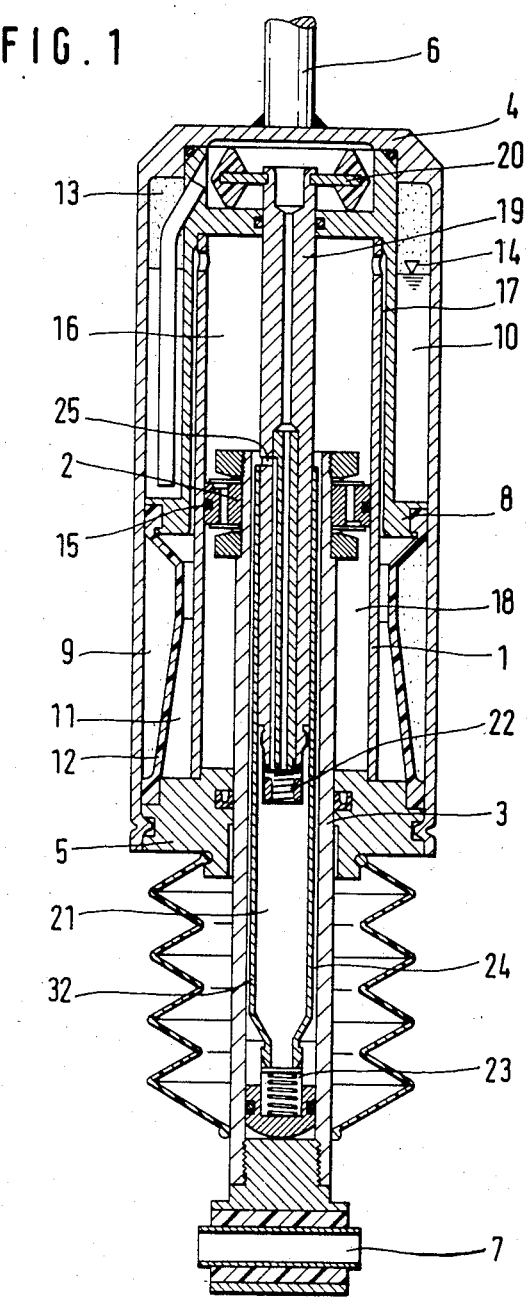
FIG. 1 shows a sectional view of a self-pumping hydropneumatic spring leg or strut with internal level control in accordance with the invention.

Referring to FIG. 1, the level control arrangement illustrated therein for motor vehicles essentially comprises the working cylinder 1 of the spring leg or strut, in which a piston 2 at the end of a piston rod 3 is slidable. At one end the working cylinder 1 is closed off by an end portion 4 while at the other end it is closed off by a cover member 5. The piston rod 3 passes sealingly outwardly through the cover member 5. The end portion 4 is secured to the structure of the vehicle by means of a fixing pin or rod 6 while the piston rod 3 is secured to the axle of the vehicle by means of a fixing eye 7, in a conventional manner not shown in the drawing. The working cylinder 1 is surrounded by an annular compensating chamber which is filled partly with oil and partly with gas and which is subdivided by an intermediate partitioning wall 8 into a high pressure chamber 9, 11 and a low pressure chamber 10. A high pressure gas cushion 9 is separated from an oil space 11 by a diaphragm 12. In the low pressure chamber 10, oil and a low pressure gas cushion 13 are not separated from each other. The oil level is indicated at 14. In the completely adjusted-down condition, that is to say, in the condition in which the arrangement is not pumped up, the pressure obtained in the low pressure chamber 10 is the same as the pressure in the high pressure chamber 11, 9.

The inner working chamber 16 at the end of the spring leg, between the working piston 2 and the end portion 4, communicates with the oil space 11 of the high pressure chamber 9, 11 by way of the duct 17. The working chamber 18 which is arranged at the end between the working piston 2 and the cover member 5 cooperates with the inner working chamber 16 of the working cylinder 1 by way of valves in the working piston 2, all of which may be considered as generally conventional and known in the art.

A pump rod 19 is secured to the end portion 4 by a resilient mounting means 20 and, together with a pump cylinder 21 provided by a control tube 32 disposed in the hollow space inside the piston rod 3, forms an oil pump. The movements of the vehicle axle and the piston rod 3 which is secured thereto, being caused by irregularities of the road surface, actuate the oil pump which constantly delivers oil, controlled by the suction valve 22, from the low pressure chamber 10 by way of the pressure valve 23 and through the duct 24 into the working cylinder 1. As a result of that, the working piston 2 and the piston rod 3 with the control tube 32 are displaced outwardly until control openings 25 in the pump rod 19 open a communication between working chamber 16 of working cylinder 1, which is under high pressure, and the low pressure chamber 10. This initiates the adjust-down control function.

Figure 2:
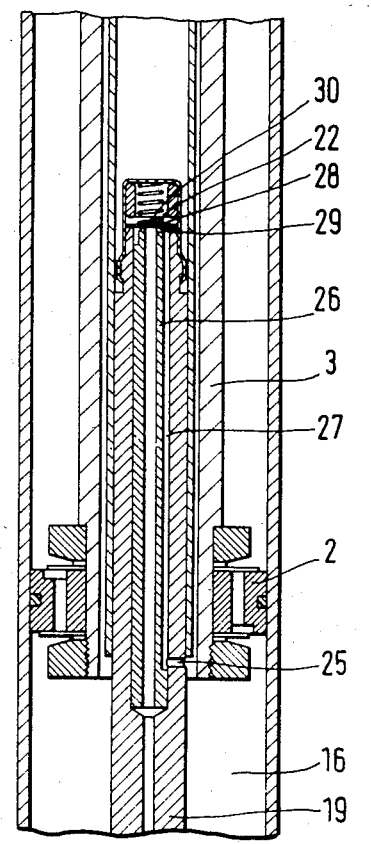
FIG. 2 shows a sectional view of a portion of the piston rod together with the working cylinder and the pump rod.

FIG. 2 is a view on an enlarged scale of a portion of the pump rod 19, the piston 2 and the piston rod 3, shown inverted relative to the orientation illustrated in FIG. 1. In its hollow interior, the pump rod 19 has a sleeve 26, with the end of the pump rod 19 being engaged by the valve plate 30. If the piston rod 3 is displaced outwardly (upwardly as viewed in FIG. 2) until it takes up the position shown in FIG. 2, the control opening 25 is opened and the adjust-down control function is initiated, in that the oil flows from the working cylinder 1, which is subjected to high pressure, by way of the control opening 25, the connecting duct 27 and the throttle 28, through the hollow interior of the pump rod 19 to the low pressure chamber 10. As previously mentioned, an opening 29 may be formed in the end of sleeve 26 as part of the throttle means 28, the end of the sleeve 26 apart from opening 29 being closed by a valve plate 30 of the suction valve 22, which valve plate also closes the end face of the pump rod 19. In the event of such an opening 29 becoming blocked, in the next suction stroke movement of the piston rod 3 the suction valve is opened, and thus the through-flow cross section is considerably enlarged, thereby flushing out any blockage in the opening 29. One or more such openings 29 may be formed in the end surface of the sleeve 26 in communication with duct 27. With the valve plate 30 resting on the end of sleeve 26, the opening or openings 29 are thus delimited in part by the sleeve in which they are formed, and in part by the valve plate 30.

Figure 3:
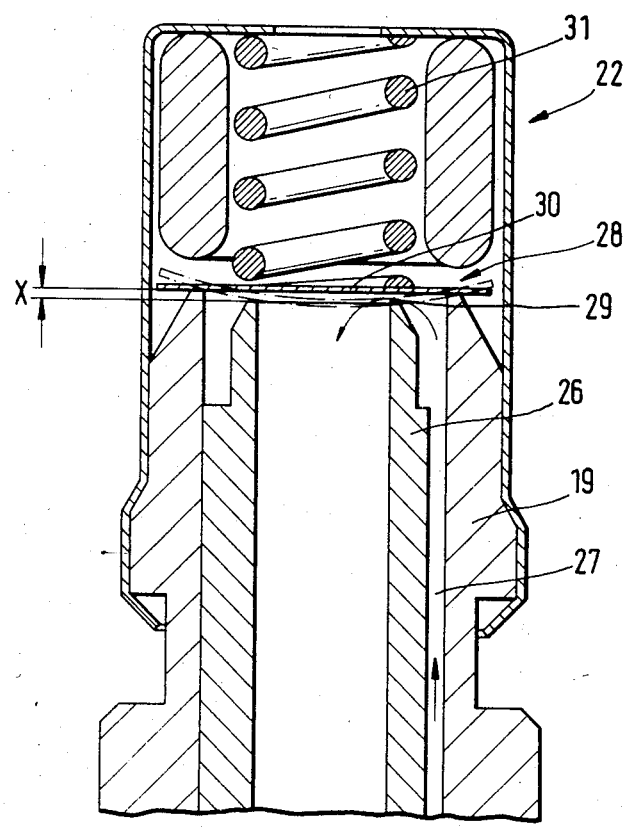
FIG. 3 shows a sectional view on an enlarged scale of a throttle member cooperating with the pump suction valve.

FIG. 3 shows an embodiment of a load-dependent or pressure-dependent throttle means 28, wherein the pump rod 19 is provided with the suction valve 22 at its end, and the sleeve 26 is spaced from the end surface of the pump rod 19 by the distance indicated by X. The end surface of the pump rod 19 serves as an abutment surface for the valve plate 30 of the suction valve 22 and forms, together with the end surface of the sleeve 26, depending on the respective pressure conditions occurring, a variable throttle means 28 in the form of a variable clearance or opening 29 for controlling the oil which is arriving through the connecting duct 27. The valve plate 30 is of such a configuration that predetermined pressures cause the clearance or opening 29 to be closed, or a predetermined through-flow passage to be opened, by flexing of the valve plate. It will be understood that the features of FIGS. 2 and 3 could be combined, in that an opening 29 could be formed in the end surface of sleeve 26 in the embodiment of FIG. 3 to function in cooperation with the variable clearance or opening 29 illustrated in FIG. 3. In the same manner, the embodiment of FIG. 2, with its opening 29 formed in the end surface of sleeve 26, could have the end surface of sleeve 26 spaced slightly below the end of pump rod 19 by a distance X as in the embodiment of FIG. 3.

Figure 4:
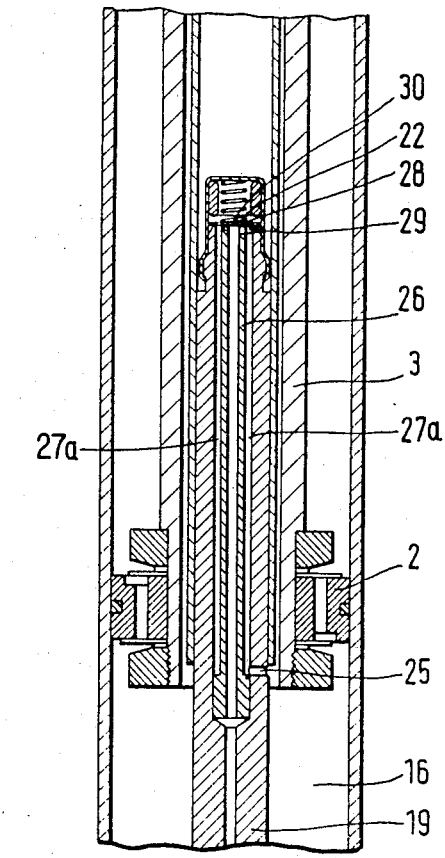
FIGS. 4 and 5 show a sectional view of a portion of the piston rod together with the working cylinder and the pump rod in an alternate embodiment.
Figure 5:
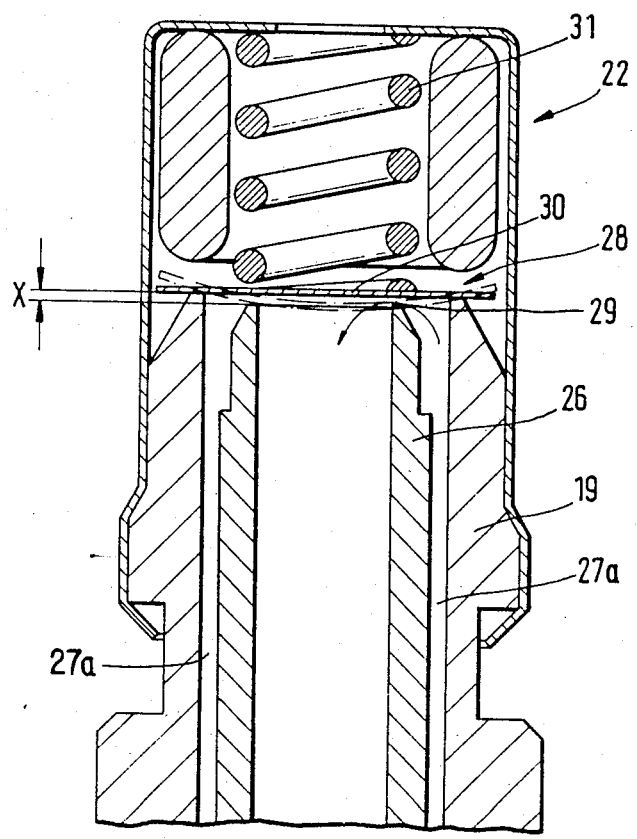

FIGS. 4 and 5 show an embodiment of the invention wherein a connecting duct 27a extends about the outside of the cylindrical surface of the sleeve 26.

Figure 6:
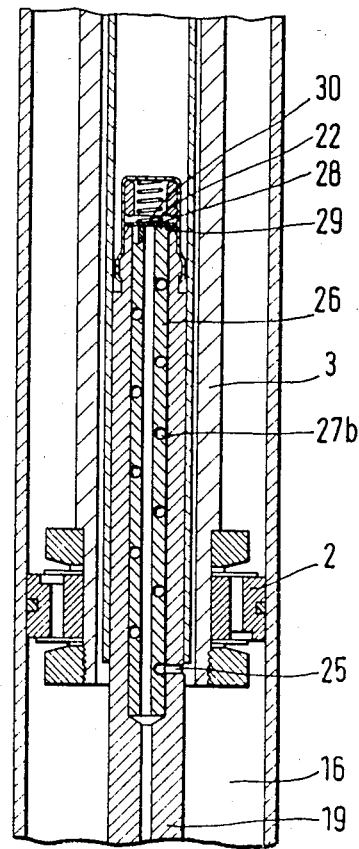
FIGS. 6 and 7 show a sectional view of a portion of the piston rod together with the working cylinder and the pump rod in an alternate embodiment.
Figure 7:
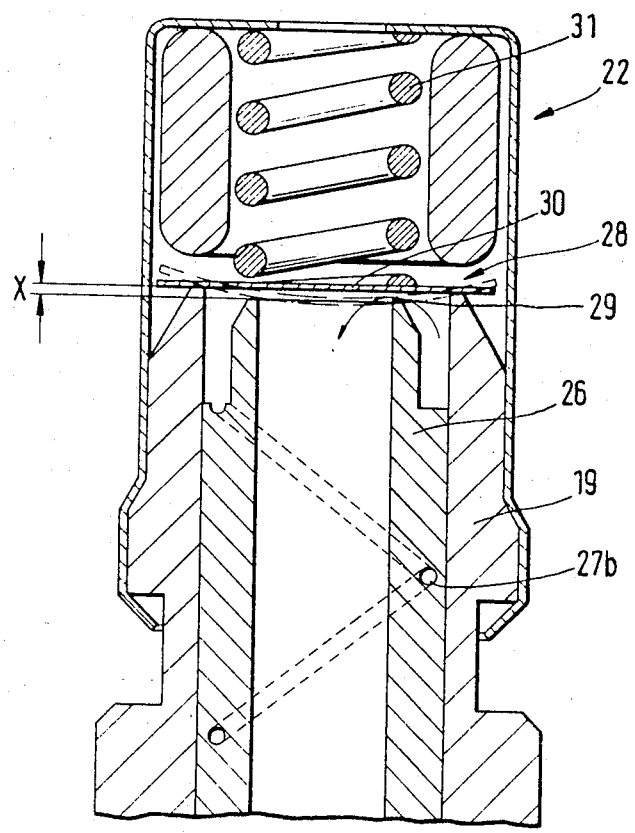

FIGS. 6 and 7 show the connecting duct 27 in a helical configuration within the space occupied by the sleeve 26 and the piston rod 19.

In all embodiments, no throttling function need be assigned to control opening 25. The requisite throttling or delay action can be achieved through any of the various arrangements described, including the length and cross section of the connecting duct 27, the openings 29 in the end surface of sleeve 26 as in FIG. 2, or the variable clearance or opening 29 as in FIG. 3, or any combination of these. Whereas in keeping with the prior art control opening 25 would normally directly connect working chamber 16 with the bore of pump rod 19, with the substantial risk of overly sensitive and undesired adjust-down upon temporary opening of control opening 25, this is effectively precluded in the instant invention, such that there is practically no possibility of undesired adjust-down. Additionally, any clogging of clearance or opening 29 in the throttle arrangement is effectively precluded because of the action of the valve plate.

Having thus described and illustrated exemplary preferred embodiments in accordance with our invention, we claim:

1. In a self-pumping hydropneumatic telescopic spring leg with internal level control, particularly for motor vehicles, comprising an oil-filled working cylinder, gas cushion means for subjecting said oil-filled working cylinder to gas cushion pressure, a working piston displaceable in the working cylinder for transmitting forces, a hollow space in a piston rod connected with said piston, the hollow space in the piston rod forming a pump cylinder, a pump rod secured to the working cylinder and extending into said pump cylinder, said working piston dividing said working cylinder into two working chambers, means forming a low pressure oil chamber, a bore formed in said pump rod and communicating at one end with said low pressure oil chamber, a suction valve carried by said pump rod at the other end for controlling said bore, discharge valve means communicating with said pump cylinder for passing pumped oil from said pump cylinder into one of said working chambers subjected to said gas cushion pressure, whereby relative reciprocation of said pump rod and pump cylinder pumps oil from said low pressure oil chamber to said one working chamber to increase the pressure in said working cylinder, and control means responsive to a predetermined working position of said working piston in said working cylinder for connecting said one working chamber with said low pressure chamber, said control means comprising a control opening in said pump rod extending between said working cylinder and said bore in the pump rod, control edge means movable with said working piston for closing said control opening and for opening said control opening when said working piston is in said predetermined working position, wherein the improvement comprises a sleeve in said pump rod for preventing said control opening from having direct access to said pump rod bore and said low pressure chamber, and for routing oil flow from said control opening indirectly via a connecting duct and throttle means to said pump rod bore when said control opening is in the open state so as to retard pressure reduction in said one working chamber upon opening of said control opening.

2. Apparatus as claimed in claim 1 wherein said throttle means cooperates with said suction valve.

3. Apparatus as claimed in claim 2 wherein said suction valve has a valve plate which is supported against the end surface of said pump rod, said valve plate being resilient and being resiliently prestressed at least at its center portion so as to bend inwardly toward said bore, the end surface of said sleeve being disposed in said bore and axially spaced from the end surface of said pump rod, the valve plate and the end surface of said sleeve spaced therefrom forming said throttle means.

4. Apparatus as claimed in claim 1 wherein said throttle means is arranged in an end surface of said sleeve and has at least one opening, and that the end surface of said sleeve is located so as to serve as an abutment surface for a valve plate of said suction valve.

5. Apparatus as claimed in claim 4 wherein the other end of said pump rod is adjacent an end surface of said sleeve and extends beyond said end surface of said sleeve, and wherein said opening is formed between said end surface of said sleeve and said valve plate abutting said other end of said pump rod.

6. Apparatus as claimed in claim 1 wherein said connecting duct has a predetermined throttle cross section over at least part of its length to form said throttle means.

7. Apparatus as claimed in claim 1 wherein said connecting duct extends in a helical configuration between said sleeve and said pump rod to form said throttle means.

8. Apparatus as claimed in claim 1 wherein said connecting duct is in the form of an annular gap defined between the inside surface of said pump rod and the outside surface of said sleeve, and is configured in length and cross section so as to form said throttle means.

9. In a self-pumping hydropneumatic telescopic spring leg with internal level control, particularly for motor vehicles, comprising an oil-filled working cylinder, gas cushion means for subjecting said oil-filled working cylinder to gas cushion pressure, a working piston displaceable in the working cylinder for transmitting forces, a hollow space in a piston rod connected with said piston, the hollow space in the piston rod forming a pump cylinder, a pump rod secured to the working cylinder and extending into said pump cylinder, said working piston dividing said working cylinder into two working chambers, means forming a low pressure oil chamber, a bore formed in said pump rod and communicating at one end with said low pressure oil chamber, a suction valve carried by said pump rod at the other end for controlling said bore, discharge valve means communicating with said pump cylinder for passing pumped oil from said pump cylinder into one of said working chambers subjected to said gas cushion pressure, whereby relative reciprocating of said pump rod and pump cylinder pumps oil from said low pressure oil chamber to said one working chamber to increase the pressure in said working cylinder, and control means responsive to a predetermined working position of said working piston in said working cylinder for connecting said one working chamber with said low pressure chamber, said control means comprising a control opening in said pump rod extending between said working cylinder and said bore in the pump rod, control edge means movable with said working piston for closing said control opening and for opening said control opening when said working piston is in said predetermined working position, wherein the improvement comprises a sleeve in said pump rod for preventing said control opening from having direct access to said pump rod bore and said low pressure chamber, and for routing oil flow from said control opening indirectly via a connecting duct and throttle means to said pump rod bore when said control opening is in the open state so as to retard pressure reduction in said one working chamber upon opening of said control opening, wherein said throttle means cooperates with said suction valve, and wherein said throttle means is arranged in an end surface of said sleeve and has at least one opening, and that the end surface of said sleeve is located so as to serve as an abutment surface for a valve plate of said suction valve.

10. Apparatus as claimed in claim 9 wherein the other end of said pump rod is adjacent an end surface of said sleeve and extends beyond said end surface of said sleeve, wherein said opening is formed between said end surface of said sleeve and said valve plate abutting said other end of said pump rod.

11. Apparatus as claimed in claim 9 wherein said suction valve has a valve plate which is supported against the end surface of said pump rod, said valve plate being resilient and being resiliently prestressed at least at its center portion so as to bend inwardly toward said bore, the end surface of said sleeve being disposed in said bore and axially spaced from the end surface of said pump rod, the valve plate and the end surface of said sleeve spaced therefrom forming said throttle means.

12. Apparatus as claimed in claim 9 wherein said connecting duct has a predetermined throttle cross section over at least part of its length to form said throttle means.

13. Apparatus as claimed in claim 9 wherein said connecting duct extends in a helical configuration between said sleeve and said pump rod to form said throttle means.

14. Apparatus as claimed in claim 9 wherein said connecting duct is in the form of an annular gap defined between the inside surface of said pump rod and the outside surface of said sleeve, and is configured in length and cross section so as to form said throttle means.

* * * * *